Dec. 13, 1955   J. W. GRIFFIN   2,726,472
FISH LURE
Filed April 22, 1949

WITNESSES:
Edward Michaels

INVENTOR
JAMES W. GRIFFIN.
BY Arthur T. Stratton
ATTORNEY

United States Patent Office 2,726,472
Patented Dec. 13, 1955

2,726,472

FISH LURE

James W. Griffin, East Pittsburgh, Pa.

Application April 22, 1949, Serial No. 89,022

2 Claims. (Cl. 43—42.04)

This invention relates to fish lures generally, and more particularly to a buoyant type of lure fashioned to simulate a minnow, or the like.

One object of this invention is to provide a novel form of fish lure which more closely approximates live bait than has heretofore been achieved.

Another object of this invention is to provide a novel mode of securing a hook member to the body of a fish lure.

A more particular object of this invention is to provide a fish lure comprising a buoyant body suitably covered with an embossed metallic foil selectively dyed to simulate live bait.

One objection to lures which have been employed in the past is that hooks have either been attached rigidly to the body of the lure, in which case a fish may use the body of the lure as a lever to pry itself off the hook; or hooks have been loosely attached so that they hang freely downwardly from the body of the lure in an uncontrolled manner.

Accordingly, another particular object of this invention is to provide a novel yieldable resilient connection of a hook to the body of a lure where the hook is normally held in predetermined relation to the body of the lure.

These and other objects of this invention will become more apparent upon consideration of the following detailed description of a preferred embodiment thereof, when taken in connection with the attached drawing in which.

Figure 1:
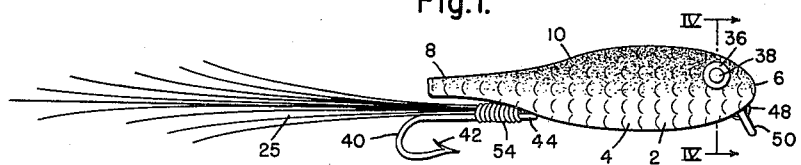
Figure 1 is a side elevation view of a fish lure constructed in accordance with this invention.

The embodiment of the invention shown on the drawing comprises a lure having a body portion 2 of buoyant material, such for example as wood, preferably red cedar or white pine. This body portion 2 is shaped in the form of a minnow with a relatively large body portion, substantially oval shaped in cross section, tapering forwardly to a rounded nose 6, and tapering rearwardly to an elongated tail portion 8.

The body 2 is covered with a layer 10 of a metallic foil material, such for example as aluminum or tin foil, and the covering may be formed in two halves 12 and may be cut at selected locations 14 from an outer edge inwardly a predetermined distance to facilitate fitting the covering half 12 to the rounded body 2 of the lure. In order to simulate fish scales, the foil covering 10 should be embossed as illustrated in Figures 1, 3, 5 and 6, with the embossed markings preferably being curved, for example circular or semi-circular in form as illustrated in 1, 3 and 6, or they may even take a spiral form.

After the covering 10 has been fitted to the body 2 of the lure and secured thereto with a waterproof glue or cement, or if desired, before the covering is applied, a pair of bores 16 and 18 are drilled substantially diagonally through the body 2 of the lure, with the bore 18 originating slightly below the nose 6 of the lure and extending upwardly and emerging at the top substantially midway of the length of body 4; and with bore 16 originating at the lower side of the lure adjacent tail portion 8 and extending upwardly to emerge at the same point as bore 18.

The two bores if formed prior to attachment of covering 10 should be located and the covering pierced after being applied at the lower origin points of the bores. Either bore 16 or 18 may be employed with the apparatus shown in Figure 6 during coating of the lure by inserting a steel pin or needle 20 therein, to provide a handle for manipulating purposes. A first coat of a clear water proof paint or lacquer is applied to coating 10 by a dipping or spraying operation, and after this has dried it is preferred that a second identical coating be applied.

Figure 6:
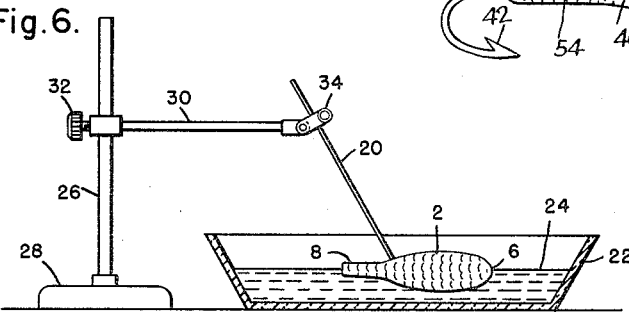
Figure 6 is an elevation view partially in section of an apparatus for coating the lure during manufacture thereof.

The apparatus shown in Figure 6 includes a pan 22 for receiving the dye or paint solution 24 to be applied to the lure, and is adapted to be used in conjunction with a stand 26, which includes a base portion 28 and an adjustable supporting arm 30, which may be secured to any desired position on stand 26 by means of a set screw 32, or the like. The outer end of arm 30 carries a friction type holder 34 for receiving the pin 20 mounted in one of bores 16 or 18 of the lure body 2. It will be observed that this arrangement for supporting the lure enables it to be held in the dye or paint solution 24 at any desired depth, with preferably only about half of the lure, comprising the upper half thereof being emersed in the dye or paint solution 24. It is preferred to use a green dye or paint and this may be varied in shade by the use of small amounts of other colors as may be desired. After submersion in the dye or paint a short time, for example about five minutes, it may be removed and dried.

Following the dyeing or painting operation the eyes should be attached, and these are each formed of a pair of disks including a relatively large disk 36 cemented directly to the coating 10, and being of a translucent light colored material, such for example as an artificial resin of a color such as yellow. In order to enhance the color of large disks a layer of plain metail foil 37, such as tin foil is cemented directly to the back of this disk. The other disk 38 is smaller and is cemented to disk 36 substantially centrally thereof, and may be of the same material comprising disk 36 but of a darker color, or if desired some opaque material may be employed. After the eyes are secured in place the whole lure is given another coating of a clear paint or lacquer.

Figure 7:
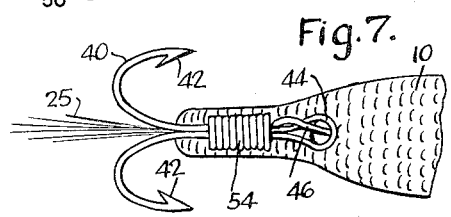
Fig. 7 is an enlarged bottom view of the tail portion of the lure shown in Figs. 1, 2 and 4 showing the mode of securing the hook to the lure.

An important feature of this invention resides in the mode of securing a hook or hooks to the lure, with a hook 40 being shown on the drawing which may be of the double barbed type as shown in Fig. 7. The hook is located beneath the tail portion 8 of the lure with the barbs 42 lowermost, and with the securing eye 44 located adjacent the body of the lure. Hook 40 is adapted to be resiliently held at the position shown in Figures 1 and 2 by a leader 46, which should be of a resilient material, preferably a synthetic resin material having resilient properties such as, nylon. A loop knot 48 is tied at one end of leader 46, and may include an integral loop 50, or the loop 50 may be a separate metallic ring to which a fish line may be secured. The leader 46 is then threaded through bore 18 and bore 16 and then passed through securing eye 44 of hook 40. The hook 40 is drawn up tightly on the leader to slightly tension the latter with ring 50 drawn up tight against the entrance of bore 18, and then the hook is secured to the leader by having the leader bound about the shank of the hook adjacent securing eye 44, and the end of the leader then secured as by a clinch knot or the like, and the whole wrapping and knot is then cemented to prevent it from working loose.

Figure 2:
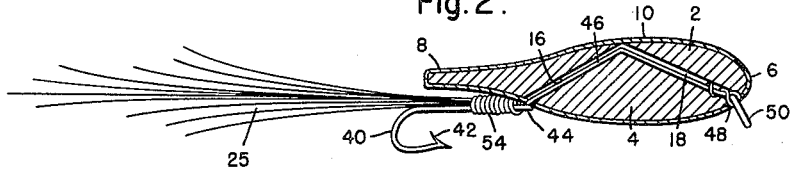
Figure 2 is a longitudinal section view through the lure shown in Figure 1.
Figure 3:
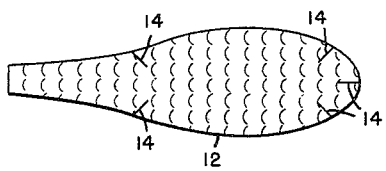
Figure 3 is a plan view of one-half of the covering for the lure shown in Figures 1 and 2.
Figure 4:
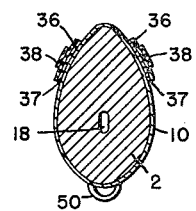
Figure 4 is a transverse section view taken substantially on the line IV—IV of Figure 1.
Figure 5:
Figure 5 is an enlarged fragmentary sectional view of the covering shown in Figure 3.

The above operation of attaching hook 40 is very important, first because the choice of the hook itself determines the balance of the lure, preferably to always maintain it in an upright position, and since it is substantially to the rear of the center of buoyancy of the lure and is held at that position by the particular mode of securement of hook 40 to leader 46, it will operate to tip the lure so that the nose 6 will rest above the water line and the tail 8 will be submerged about 20 to 30 degrees below the water line. It will be noted that since leader 46 extends downwardly through securing eye 44 of hook 40 and then is wrapped upwardly around the shank of the hook with the leader slightly tensioned, the hook will be held with eye 44 substantially flat against the body of the lure, while permitting pivotal movement of the hook 40 about the axis of eye 44. Moreover, hook 40 may also be moved as a whole to vary the angle between its longitudinal axis and the longitudinal axis of the lure, but such relative movement of the hook and lure stresses leader 46 so that when released the hook will always return due to the resilient properties of leader 46, to its normal angular position relative to the lure shown in Figures 1 and 2 of the drawing. This combined pivotal and resilient mounting of the hook is important because when a fish strikes, it cannot use the lure as a lever, as when the hook is rigidly attached to the lure body, and yet the lure does not dangle or hang down vertically from the lure, as in the case of a hook which is loosely pivotally mounted on the lure body.

If desired a tail 25 may be secured to the hook by binding 54, with the tail comprising a number of hairs, such as horse hairs.

From the foregoing it should be apparent that a lure constructed in accordance with this invention provides a particularly life-like appearance, by virtue of the particular coating material applied thereto, and also embodies a particularly advantageous mounting of a hook on the lure body. Accordingly, having particularly described the invention in accordance with the patent statutes, it is desired that it be understood that this invention is not to be limited to the particular details of structure described herein, since it will be apparent that certain features, such as the hook mounting may be used with lure bodies fashioned in a different manner and the particular body described herein may likewise be employed with various types of hook mountings. Accordingly, it is desired that this invention be interpreted as broadly as possible in accordance with the attached claims.

I claim:

1. A fish lure comprising, an elongated body of buoyant material, said body having bores extending therethrough from one side thereof adjacent each end, respectively, to a common point at the opposite side of said body, a fish hook having a shank formed with an eye at one end, a leader of resilient material extending continuously through said bores, a layer of thin material secured over said body and completely covering the same including said common point of said bores except at the free ends of said bores, eyes on said body, said leader being under tension and having means at one end held by said tension against said covering to hold it against the body at the free end of one of said bores and adapted to have a line attached thereto at said one end, and said leader extending through the eye and being wound several times around the shank of the hook, and a securing means maintaining the leader in a fixed position on the shank, said leader being adapted to urge the shank to a position in close proximity to the layer of covering material with its axis substantially parallel to the axis of the body.

2. A fish lure as set forth in claim 1 wherein said eyes comprise a plurality of superposed substantially circular disks of different size and distinctive color secured together, with the larger of said disks being secured directly to said body and being of a translucent material.

References Cited in the file of this patent

UNITED STATES PATENTS

| Number | Name | Date |
|---|---|---|
| 954,691 | Pflueger | Apr. 12, 1910 |
| 1,385,627 | Lane | July 26, 1921 |
| 1,390,458 | Moree | Sept. 13, 1921 |
| 1,569,993 | MacLeod | Jan. 19, 1926 |
| 1,898,740 | Novitzky | Feb. 21, 1933 |
| 2,010,976 | Catarau | Aug. 13, 1935 |
| 2,092,304 | Eger | Sept. 7, 1937 |
| 2,149,464 | Potts | Mar. 7, 1939 |
| 2,162,049 | Baker | June 13, 1939 |
| 2,225,676 | White | Dec. 24, 1940 |
| 2,283,960 | Wade | May 26, 1942 |
| 2,338,577 | Divine | Jan. 4, 1944 |
| 2,423,717 | Mikina | July 8, 1947 |
| 2,502,562 | Fike | Apr. 4, 1950 |
| 2,547,469 | Husson | Apr. 3, 1951 |
| 2,579,377 | Flynn | Dec. 18, 1951 |